United States Patent
Kaeb et al.

(10) Patent No.: US 9,957,109 B2
(45) Date of Patent: May 1, 2018

(54) CLEATED BELT TUBE CONVEYOR WITH IMPROVED TRACKING AND CAPACITY

(71) Applicant: KSi Conveyor, Inc, Sabetha, KS (US)

(72) Inventors: Paul A Kaeb, Sabetha, AL (US);
Steven R Walder, Hoopeston, IL (US);
Terry N Kaeb, Hoopeston, IL (US)

(73) Assignee: KSi Conveyor, Inc., Sabetha, KS (US)

( * ) Notice: Subject to any disclaimer, the term of this patent is extended or adjusted under 35 U.S.C. 154(b) by 0 days. days.

(21) Appl. No.: 15/620,397

(22) Filed: Jun. 12, 2017

(65) Prior Publication Data
US 2017/0355527 A1     Dec. 14, 2017

Related U.S. Application Data

(60) Provisional application No. 62/349,984, filed on Jun. 14, 2016.

(51) Int. Cl.

| | | |
|---|---|---|
| *B65G 15/42* | (2006.01) | |
| *B65G 15/08* | (2006.01) | |
| *B65G 15/46* | (2006.01) | |
| *B65G 21/20* | (2006.01) | |
| *B65G 23/04* | (2006.01) | |

(52) U.S. Cl.
CPC ............ *B65G 15/42* (2013.01); *B65G 15/08* (2013.01); *B65G 15/46* (2013.01); *B65G 21/2063* (2013.01); *B65G 23/04* (2013.01); *B65G 2201/042* (2013.01)

(58) Field of Classification Search
CPC ........ B65G 15/40; B65G 15/42; B65G 15/44; B65G 15/46; B65G 15/62; B65G 15/64; B65G 21/2063; B65G 23/04; B65G 23/06; B65G 2201/042; B65G 15/08
See application file for complete search history.

(56) References Cited

U.S. PATENT DOCUMENTS

| | | |
|---|---|---|
| 2,212,024 A | 8/1940 | Stinson |
| 2,303,762 A | 12/1942 | Reimel et al. |

(Continued)

FOREIGN PATENT DOCUMENTS

| | | |
|---|---|---|
| CA | 1218622 A | 3/1987 |
| CN | 201680011 U | 12/2010 |

OTHER PUBLICATIONS

PCI, Conveyor Pulley Selection Guide, 32 Pages, Nov. 2014.
CN201680011U Machine Translated Text.

*Primary Examiner* — Leslie A Nicholson, III
*Assistant Examiner* — Keith R Campbell
(74) *Attorney, Agent, or Firm* — Coughlin Law Office; Daniel J. Coughlin

(57) ABSTRACT

A cleated belt tube conveyor for conveying granular material, such as seed and grain commodities. The conveyor comprising a cleat row profile incorporating one or more of the following aspects: taller central cleat member and a slanted or clipped peripheral cleat. A cleated belt conveyor guide element, comprised of a plurality of longitudinally spaced-apart lugs that extend from an inner surface of the belt is also disclosed. A cogged roller, having a plurality of channel segments divided by drive bars, complements the guide element. Also a baffle assembly can be disposed within the conveyor tube to limit material back flow. The baffle assembly can be configured with a belt passage aperture that corresponds to the cleat row profile.

15 Claims, 21 Drawing Sheets

(56) References Cited

U.S. PATENT DOCUMENTS

| | | | |
|---|---|---|---|
| 2,540,670 A | 2/1951 | Hoenecke | |
| 2,864,488 A | 12/1958 | Taipale | |
| 2,875,887 A | 3/1959 | Hinchcliffe | |
| 2,966,254 A * | 12/1960 | Kaiser | B65G 37/00 198/626.4 |
| 3,100,566 A | 8/1963 | Hinchcliffe | |
| 3,147,851 A | 9/1964 | Dietrich | |
| 3,311,221 A | 3/1967 | Burkitt et al. | |
| 3,326,354 A | 6/1967 | Aydelott | |
| 3,595,378 A | 7/1971 | Kamisaka | |
| 3,647,049 A * | 3/1972 | Hartzell, Jr. | B65G 15/42 198/711 |
| 4,382,502 A | 5/1983 | Beresinsky | |
| 4,688,669 A | 8/1987 | Wobick et al. | |
| 4,696,390 A | 9/1987 | Curtis | |
| 4,712,668 A | 12/1987 | Gray | |
| 4,953,690 A | 9/1990 | Herzke | |
| 5,511,652 A | 4/1996 | McGinnis | |
| 6,024,209 A | 2/2000 | Nolte | |
| 6,170,646 B1 * | 1/2001 | Kaeb | B65G 15/08 198/819 |
| 6,360,878 B1 | 3/2002 | Deal et al. | |
| 6,405,855 B1 | 6/2002 | Peltier et al. | |
| 6,422,381 B1 | 7/2002 | Eberle | |
| 6,675,958 B2 | 1/2004 | Kaeb et al. | |
| 7,000,758 B2 | 2/2006 | Bjorklund | |
| 8,292,065 B1 | 10/2012 | Neufeld et al. | |
| 8,299,374 B2 | 10/2012 | Brandt | |
| 9,096,376 B1 | 8/2015 | Wood et al. | |
| 9,254,963 B2 | 2/2016 | Schroeder | |
| 9,630,779 B2 | 4/2017 | Kaeb et al. | |
| 2002/0139643 A1 | 10/2002 | Peltier et al. | |
| 2004/0089519 A1 * | 5/2004 | Pollak | B65G 15/64 198/834 |
| 2010/0326798 A1 | 12/2010 | Friesen | |
| 2012/0285801 A1 | 11/2012 | Feufeld et al. | |
| 2013/0168209 A1 * | 7/2013 | Fanshier | A01D 87/02 198/699.1 |

\* cited by examiner

CLEATED BELT TUBE CONVEYOR WITH IMPROVED TRACKING AND CAPACITY

CROSS-REFERENCES

This application claims the benefit of U.S. Provisional Application No. 62/349,984 titled Cleated Belt Tube Conveyor with Improved Tracking and Capacity, filed on Jun. 14, 2016.

GOVERNMENT RIGHTS

Not Applicable.

REFERENCE TO CDS

Not Applicable.

FIELD

The present invention relates to cleated conveyor belts for use with tube conveyors for moving particulate matter and improving the transport capacity of the conveyor and the tracking of the belt.

BACKGROUND

Cleated belt conveyors are an effective solution for transporting particulate material at an incline. The cleats members are affixed at predetermined locations on the belt. The cleat members can have notched edges forming gaps between individual cleat members. As the flat conveyor belt is directed through a curvilinear structure—such as a tube—both the conveyor belt and cleats adapt to the shape of the curvilinear structure. The arrangement and shape of the cleat members cause the individual cleat members to form a cleat wall, thereby, preventing materials from sliding backwards on the conveyor belt during movement of the conveyor belt through the structure.

In certain applications there is a need for improved material conveyance rates. In the agricultural applications, there is only a narrow window for planting or harvesting. The operator requires that grain from a wagon or truck be transferred as quickly as possible. However, increasing the belt speed can cause additional damage to the grain and increasing the diameter of the tube decreases the portability of the conveyor system and increases the cost to manufacture the conveyor system. This requirement has proved especially challenging when transferring particulate or granular material at angles greater than 30 degrees, where the material slides backwards over the tops of the cleat rows.

Increasing the height of the cleat row results in increased transfer rates. However, increased cleat height also increases wear on the belt as the cleats rub against transition sections of the conveyor. Contact between the cleats and the conveyor tube, transition sections, and return pan decreases the useful life of the cleated belt. Increasing cleat height also increases the manufacturing cost of the conveyor, as additional material is required to manufacture the larger cleats. Merely increasing the cleat height increases the cost of the cleated belt and decreases its useful life.

Proper belt tracking is also essential for efficiently driving an endless conveyor belt without excessive wear on the belt. Tracking refers to maintaining proper alignment of the moving belt with the rollers. When the belt is out of alignment, the belt can rub against the sidewall of the conveyor frame. This wear compromises the integrity of the belt, leading to costly and time-consuming maintenance to the conveyor.

For the foregoing reasons, there is a need for a conveyor belt that can transfer material at increased conveyance rates, without increasing the belt speed, and for properly tracking a cleated belt conveyor.

SUMMARY

We recognized that a baffle assembly mounted within the conveyor tube increases the transfer capacity of a cleated belt tube conveyor. As described above, when transporting particulate material at angles greater than 30 degrees, material backflow limits the material transfer rate. The baffle limits the amount of particulate material able to backflow when the particulate material flows over the top of the cleat row, especially at higher angles of operation.

The baffle provides a structure to restrain the backflow of the particulate material past a cleat row by filling in the empty space that exists in existing cleated belt tube conveyors. In existing cleated belt tube conveyors, the particulate matter begins to slide backwards as a cleat row begins to separate at the transition point near the discharge end of the conveyor. As this initial portion of grain slides backwards onto an upstream pocket of particulate matter, the slope stability of that upstream pocket can be disturbed.

The baffle assembly improves capacities in a cleated belt tube conveyor operating at angles greater than 30 degrees. In one embodiment, the baffle assembly is positioned to fit the profile of the grain mass supported by the cleat row. In another embodiment, the shape of the baffle assembly is formed to complement the empty cross sectional space defined by the cleat row profile and the inner surface of the tube.

In one embodiment, the baffle is adjustably mounted to the tube such that the operator can selectively position the baffle within the tube. At greater angles of operation, the baffle assembly can extend further into the tube. At lesser angles of operation, the baffle assembly can extend shallower into the tube.

We also recognized that the transfer capacity of a cleated belt tube conveyor could be increased by increasing the height of a central cleat member of a cleat row relative to the peripheral cleat members. Generally, taller cleat members correspond with increased transfer capacity. However, after a certain threshold the cleat members begin to contact either the transition elements or the return pan. This contact increases wear on the belt, leading to deterioration of the belt material. Increasing the height of all of the cleat members is also expensive. By increasing the height of one or more of the central cleat members relative to the height of the peripheral cleat members, we can increase the transfer capacity of the cleated belt tube conveyor without increasing the deterioration of the belt material. Increasing the height of the one or more central cleat members is also cost efficient, providing a greater increase in material transfer without compromising the useful life of the belt or unnecessarily increasing the manufacturing cost.

We also recognized that forming the peripheral cleat members with a slanted top edge increases the belt life without negatively affecting the material transfer rates. When the belt enters the tube—or other curvilinear structure—the cleat members cooperate to form a cleat wall. The cleat wall supports the granular material as the belt travels upward through the tube. The outside top corners of the peripheral cleat members contribute little to supporting the grain pocket. Rather, the grain pocket is lower than the outside top corners of the peripheral cleats during ascension in existing conveyor. The outside top corners of the peripheral cleats can be removed without substantially decreasing the transfer rate of the belt. This decreases the material needed to form the cleats. Removing the outside top corners of the peripheral cleats may also increase the belt life of a conveyor belt. During the return portion, when the conveyor belt travels through the return pan, the peripheral lateral portions of the belt can sag under the force of gravity. As such, the peripheral cleat members can drag on the lower surface of the return pan and catch on the transition elements. Removing the outside top corners of the peripheral cleat members decreases this friction point.

We also recognized that a lower guide element extending from a bottom surface of the conveyor belt assists with tracking of the conveyor belt. In one embodiment, the lower guide element is segmented. The segmented lower guide element is divided into a plurality of separate, longitudinally spaced-apart lugs that extend from a lower surface of the cleated conveyor belt. In one embodiment, the plurality of longitudinally spaced-apart lugs are bonded to the non-carrying, bottom surface of the conveyor belt.

We also recognized that a complementary keyed roller would cooperate with the lower guide element to maintain belt tracking. The complementary keyed roller has a circumferential channel corresponding to the lateral position of the lower guide element. In this way, the channel continually receives the lower guide element as the belt is driven about the roller.

We also recognized that the keyed roller can also comprise a plurality of circumferentially spaced apart drive bars that engage the longitudinally spaced-apart lugs as the belt is driven about the driven roller. The circumferentially spaced-apart drive bars can be disposed about the channel to engage the individual lugs of the segmented lower guide element to increase power transfer from the driven roller to the belt.

BRIEF DESCRIPTION OF DRAWINGS

Aspects are illustrated by way of example, and not by way of limitation, in the accompanying drawings, wherein.

DETAILED DESCRIPTION

Figure 1:
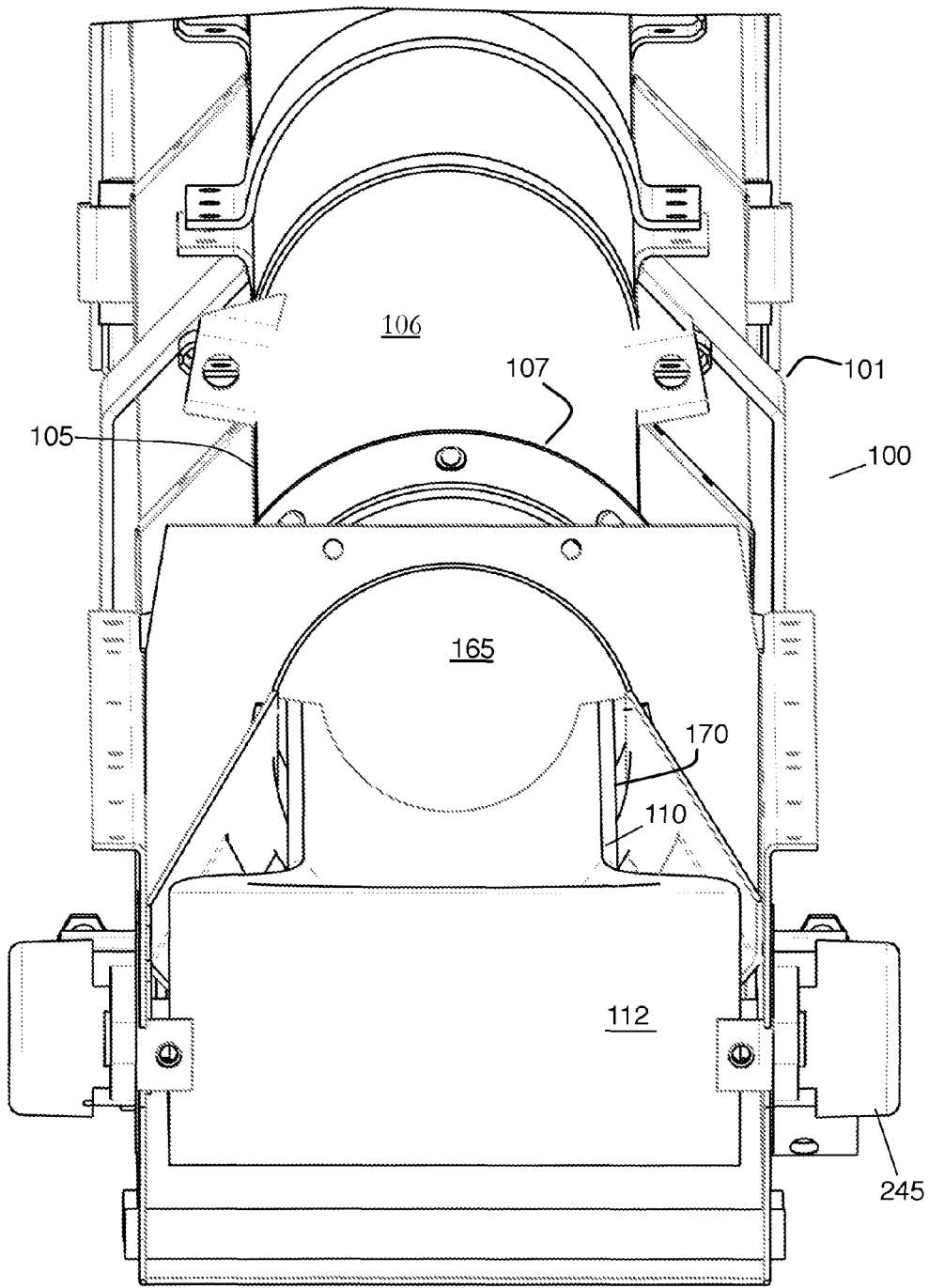
FIG. 1 is a top front perspective view of the infeed end of a conveyor.

Referring now to the invention in more detail, in FIG. 1 there is shown an infeed end of a conveyor 100. The conveyor 100 has a tube 105 made up of a plurality of tube portions 106, which are joined together at various tube flanges 107. The tube 105 extends longitudinally from the infeed end of the conveyor 100 to the discharge end. An endless belt 110 extends through the tube 105 between a driven end roller and an idler end roller 245. The belt 110 has an inner belt surface 111 and an outer belt surface 112. FIG. 1 shows the belt 110 in a flat configuration as the belt is conformed about an end roller. The belt 110 encounters a transition frame section 170, which guides the belt 110 into the tube 105. The transition frame section 170 causes the belt to transition to its configuration within a curvilinear structure, such as the tube 105. For convenience of viewing the internal structure of the infeed end of the conveyor 100, the belt is shown without cleats in FIGS. 1 and 2.

A baffle assembly 165 can be provided within the tube 105—as shown in FIG. 1—in order to prevent backflow of material through the conveyor 100. The baffle assembly is configured to at least partially fill the space between the cleat wall (not shown in FIGS. 1 and 2) and an inner surface of the curvilinear structure, such as the tube 105 of FIG. 1. An isolated view of the baffle assembly 165 is provided in FIG. 3. The baffle has a solid portion 167 and a belt passage aperture 161. The baffle assembly 165 can be mounted to the conveyor tube and or conveyor frame.

Figure 2:
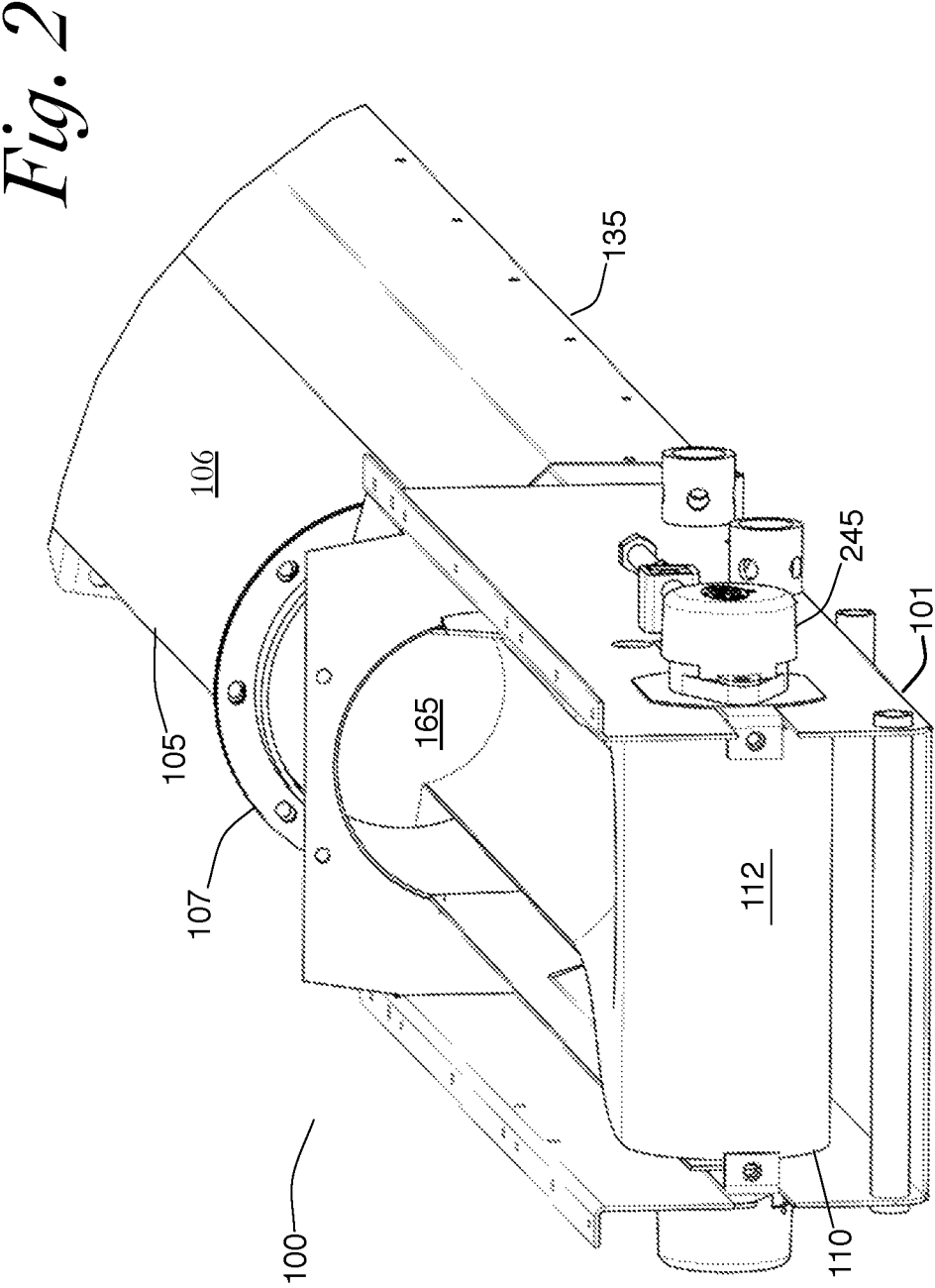
FIG. 2 is a top side perspective view the conveyor of FIG. 1.
Figure 3:
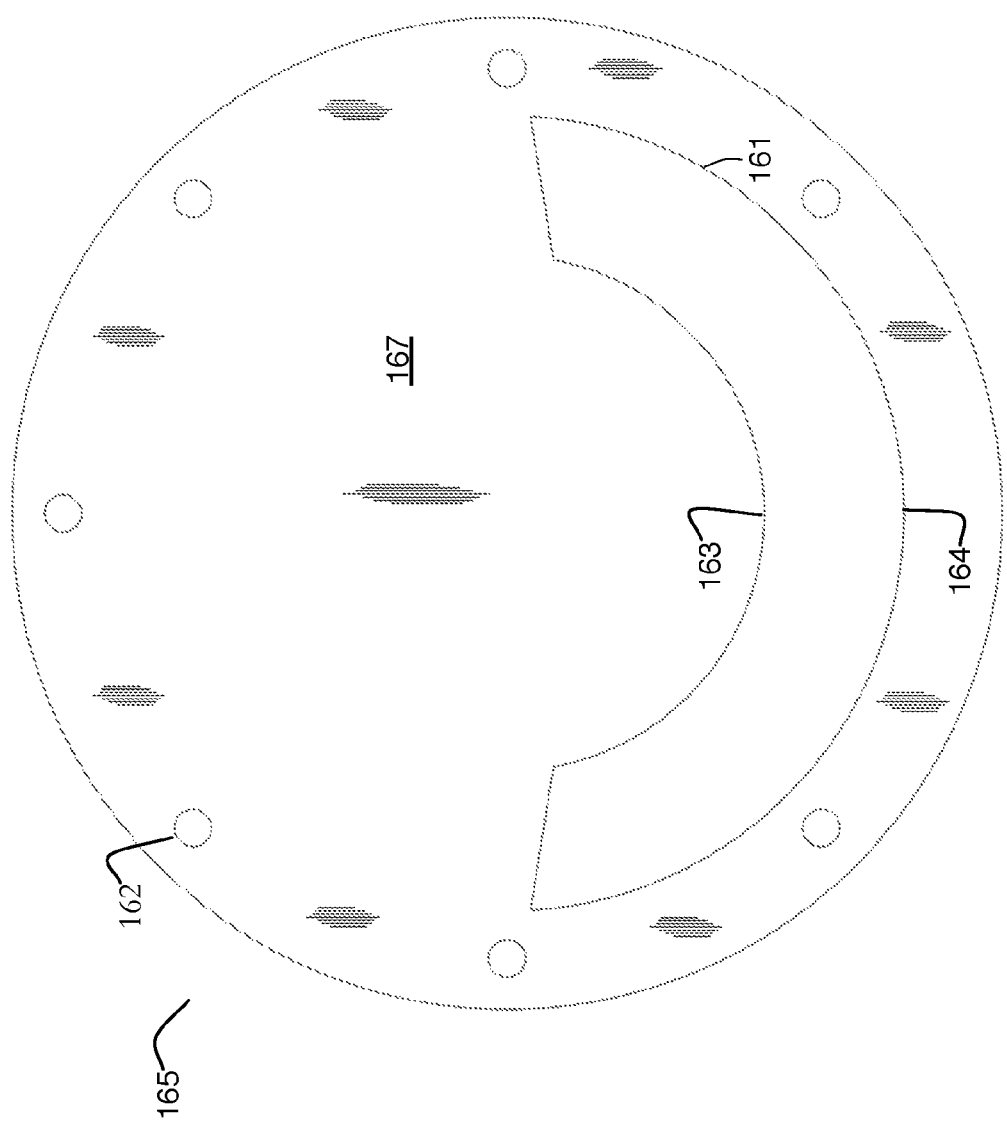
FIG. 3 is a front perspective view of a baffle.

The baffle assembly 165 can be installed within the tube 105 at one or more points through the tube. As shown in FIGS. 1-3, the baffle 165 can be mounted between two tube portions 106. A fastener (not shown) can be passed through the tube flange of a first tube portion, the tube flange of a second tube portion, and one of the mounting apertures 162 of the baffle assembly 165. During installation, the conveyor belt 110 can be initially passed through the belt passage aperture 161 of the baffle assembly 165. In an alternative embodiment, the baffle assembly 165 can be adjustably mounted within the tube, which will be discussed in greater detail below.

The belt passage aperture 161 of the baffle assembly 165 is configured to allow the belt 110 and the cleat row 130 to pass through the belt passage aperture 161. As illustrated, the bottom portion 164 of the belt passage aperture 161 is generally U-shaped and the baffle assembly 165 is installed such that the bottom portion 164 is flush with the bottom surface of the tube 105. As illustrated, the top portion 163 of the belt passage aperture 161 is generally U-shaped and the height of the top portion 163 above the bottom surface of the tube 105 corresponds to the height of the belt and the height of the cleat row 130. In conveyors with alternative embodiments of the cleat row 130, the top portion of the belt passage aperture 161 corresponds to the shape of the cleat row 130 as conformed within the curvilinear structure.

The baffle assembly 165 can also be integrated into the tube 105 of the conveyor 100 to increase transfer capacity rate, as illustrated in FIGS. 1-3. The baffle assembly fills the space between the cleats and the tube, thereby confining the material between each cleat row. In this way, the baffle assembly prevents backflow by compartmentalizing the particulate material between subsequent cleat rows. The particulate material, such as seed and grain commodities, forms a pocket defined by each respective cleat row 130. The baffle is configured to cooperate with the top profile of the cleat row. For example, a baffle for use in a conveyor with a cleated belt with uniform cleat heights would be configured to correspond to the cleat row profile.

The belt has an upper surface 112, a lower surface 111, a longitudinal axis 113, a transverse axis 114 (going along the line from one lateral side to the other lateral side), and a plurality of cleat members 115 extending from the upper surface 112 of the belt 110. The cleat members 115 are arranged in cleat rows 130 to cooperatively form a cleat wall during movement of the conveyor belt through the curvilinear structure. A plurality of cleat members extend from the upper belt surface 112. The cleat members 115 are also arranged to cooperate together to form a plurality of longitudinally spaced-apart cleat walls during movement of the conveyor belt through the curvilinear structure. In this way, the cleat wall supports at least a portion of the granular material during movement of the conveyor belt through the curvilinear structure.

The belt 110 has a plurality of cleat rows 130. The cleat rows 130 are comprised of a plurality of cleat members 115. As discussed below, there are peripheral cleat members 125 disposed on either lateral side of a respective cleat row 130. Between the peripheral cleat members 125 is disposed at least one central cleat member 120. Preferably, and as illustrated in FIGS. 1-6, the cleated conveyor belt has two central cleat members 120 disposed between the peripheral cleat members 126.

Figure 4:
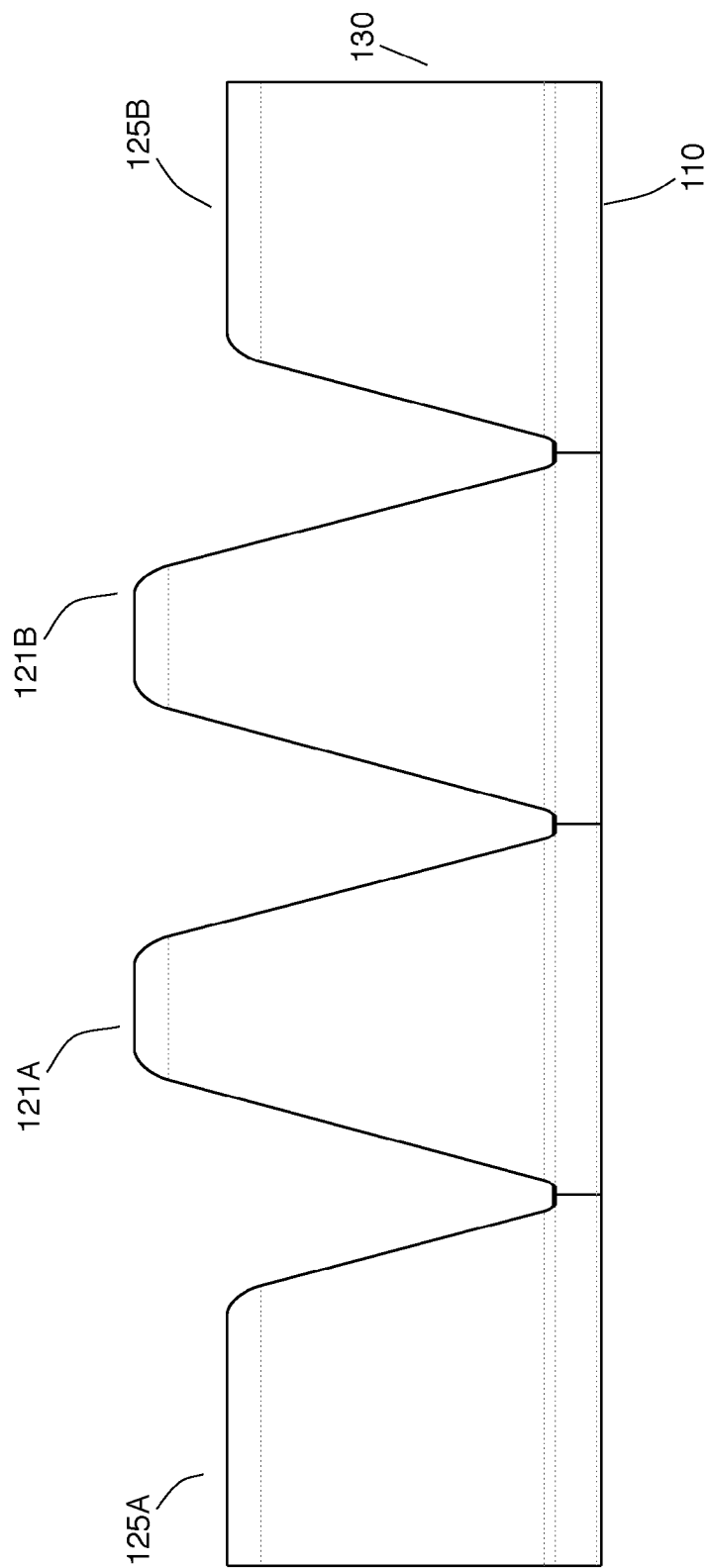
FIG. 4 is a front perspective view of a cleat row showing taller central cleat members in a flat configuration and not conformed within a curvilinear or tube structure.
Figure 5:
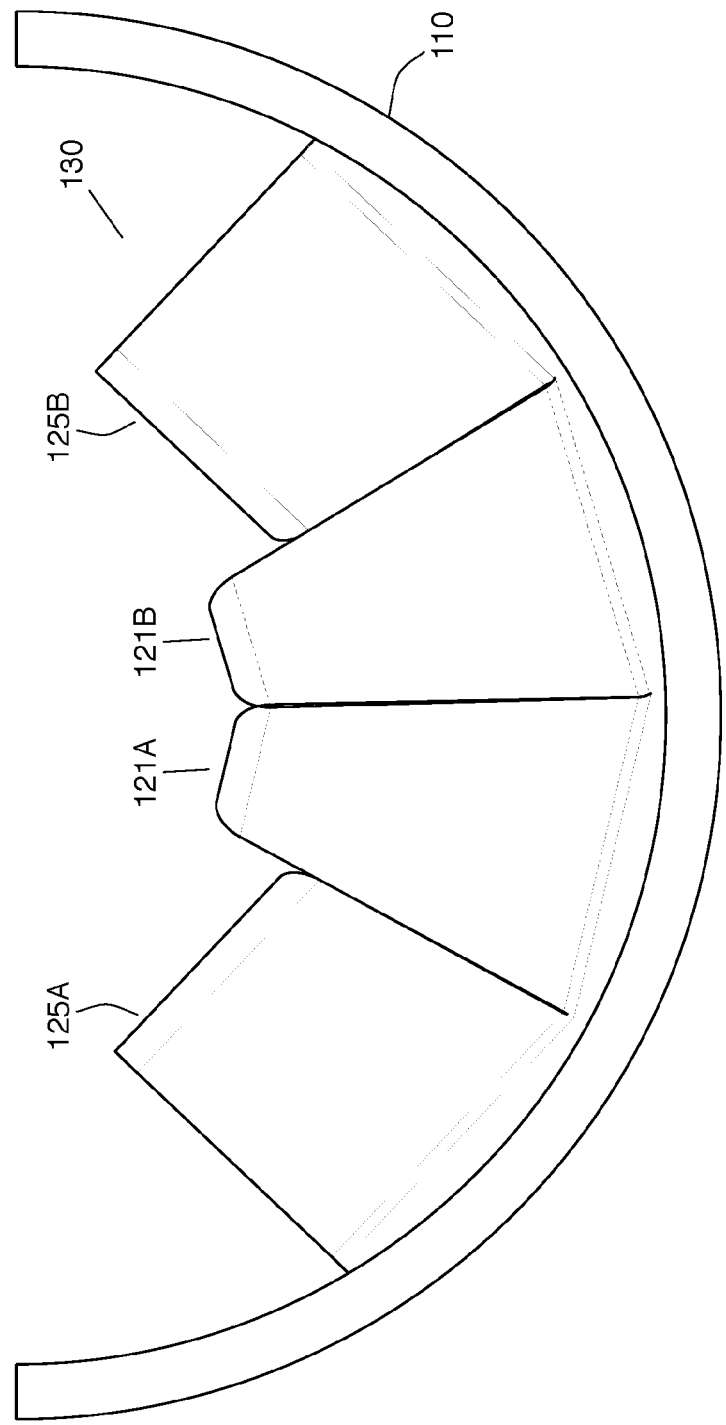
FIG. 5 is a front perspective view of the cleat row of FIG. 4 in configuration as conformed within a curvilinear structure, such as a tube.
Figure 6:
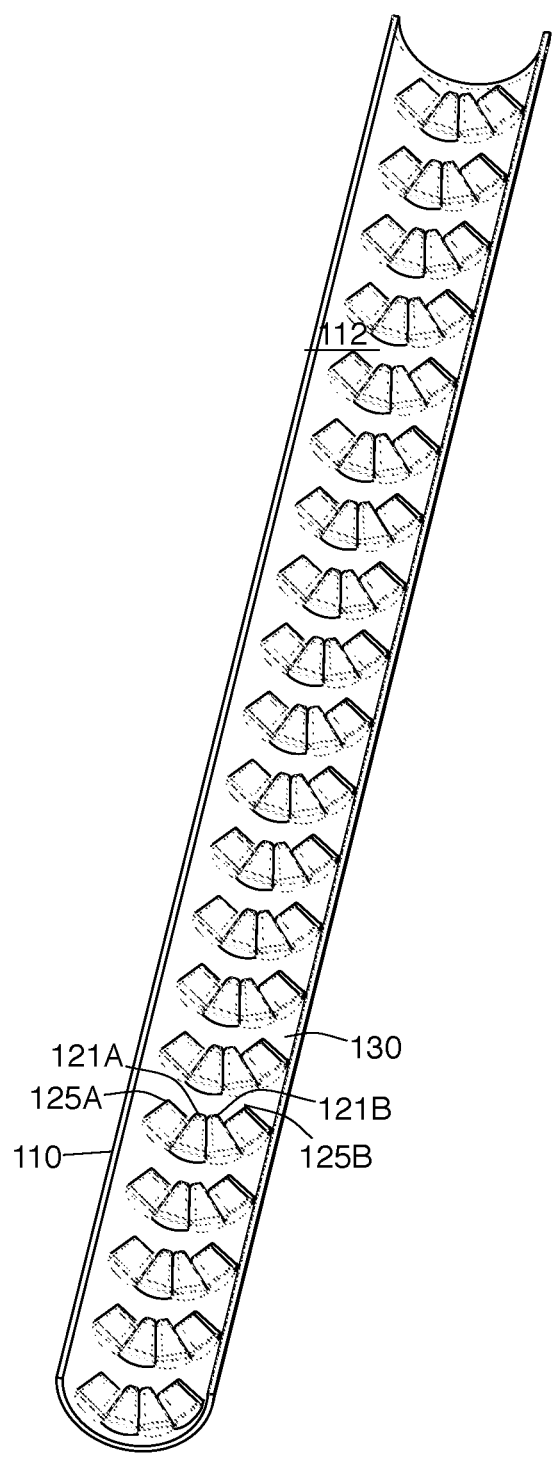
FIG. 6 is a top perspective view of a portion of a cleated belt as conformed within a curvilinear structure, such as a tube, each cleat row having taller central cleat members.
Figure 7:
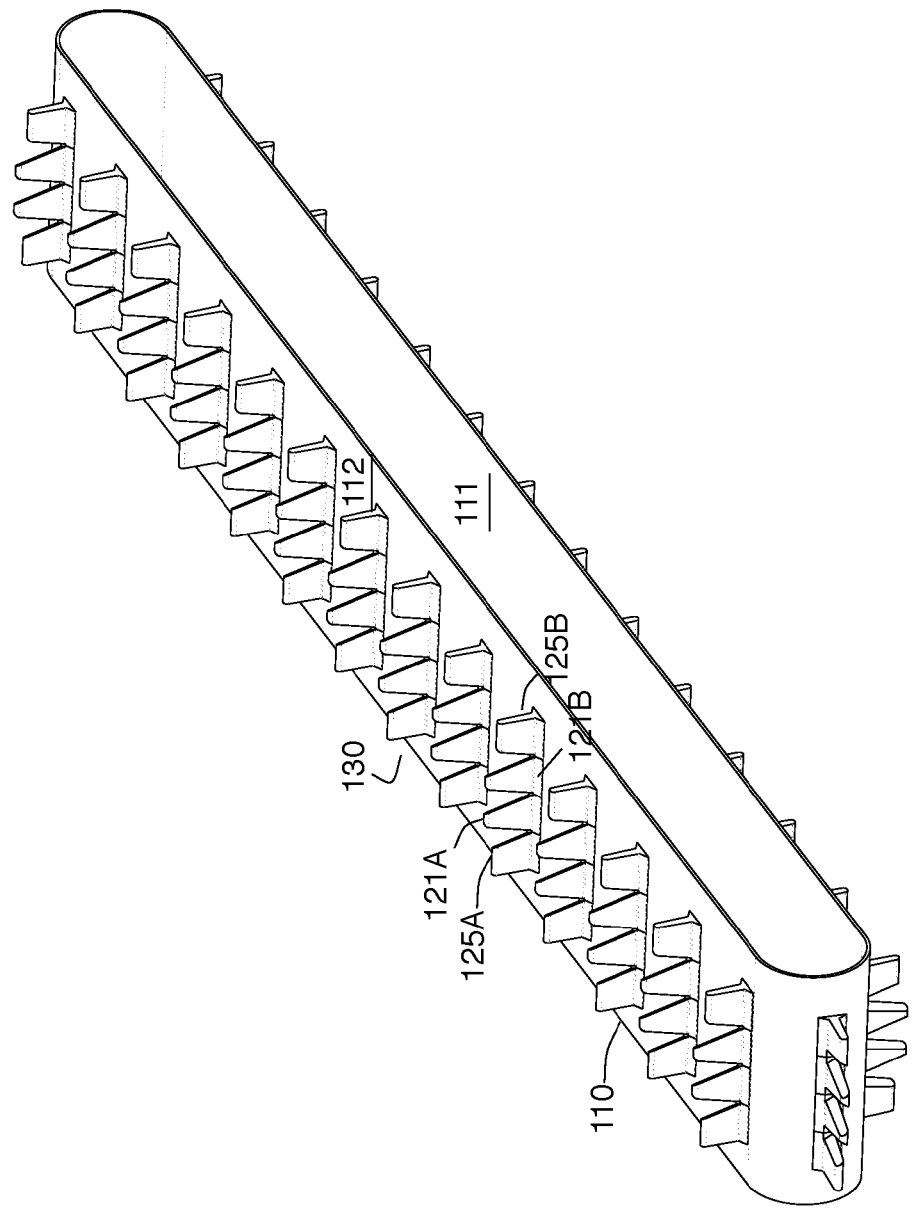
FIG. 7 is a top side perspective view of a cleated belt conveyor having taller central cleat members, the belt is shown in a flat configuration and not conformed within a curvilinear structure.

In order to increase the transfer capacity of a cleated belt tube conveyor, the central cleat members 121A, B can be formed taller than the peripheral cleat members 125A, B. As shown in FIG. 4, the taller central cleat members 121A, B are located in the lateral center of the belt 110. As the belt travels through the tube, the belt conforms to the shape of the tube 105, which is illustrated in FIGS. 5 and 6. The flat configuration of the belt having taller central cleat members 121A, B is shown in FIG. 7. The central cleat members 121A, B have a trapezoidal shape, with a wider base portion and a narrow top portion. The tips of each of the cleat members is curved. The peripheral cleat members 125 are pushed upwards and inwards to form a cleat wall with the central cleat members 121A, B. The adjoining sides of each of the individual cleat members is flat or otherwise complementary to the adjacent sidewall of the neighboring cleat member. As the belt returns through the return pan 135, the lateral edges of the belt 110 and the peripheral cleat members 125 tend to curl down and contact the return pan. However, the central portion of the belt—and the central cleat members 121A, B—have less of a tendency to droop down, as the central belt portion is held taut between the two end rollers. This characteristic prevents the taller central cleat members 121A, B from rubbing against the return pan 135, whereas taller peripheral cleat members 125A, B would make contact with the return pan 135. This contact increases wear on the belt, leading to deterioration of the belt material. By increasing the height of one or more of the central cleat members 121A, B relative to the height of the peripheral cleat members 125, the transfer capacity of the cleated belt tube conveyor can be increased without increasing the wear and deterioration of the belt material.

Figure 8:
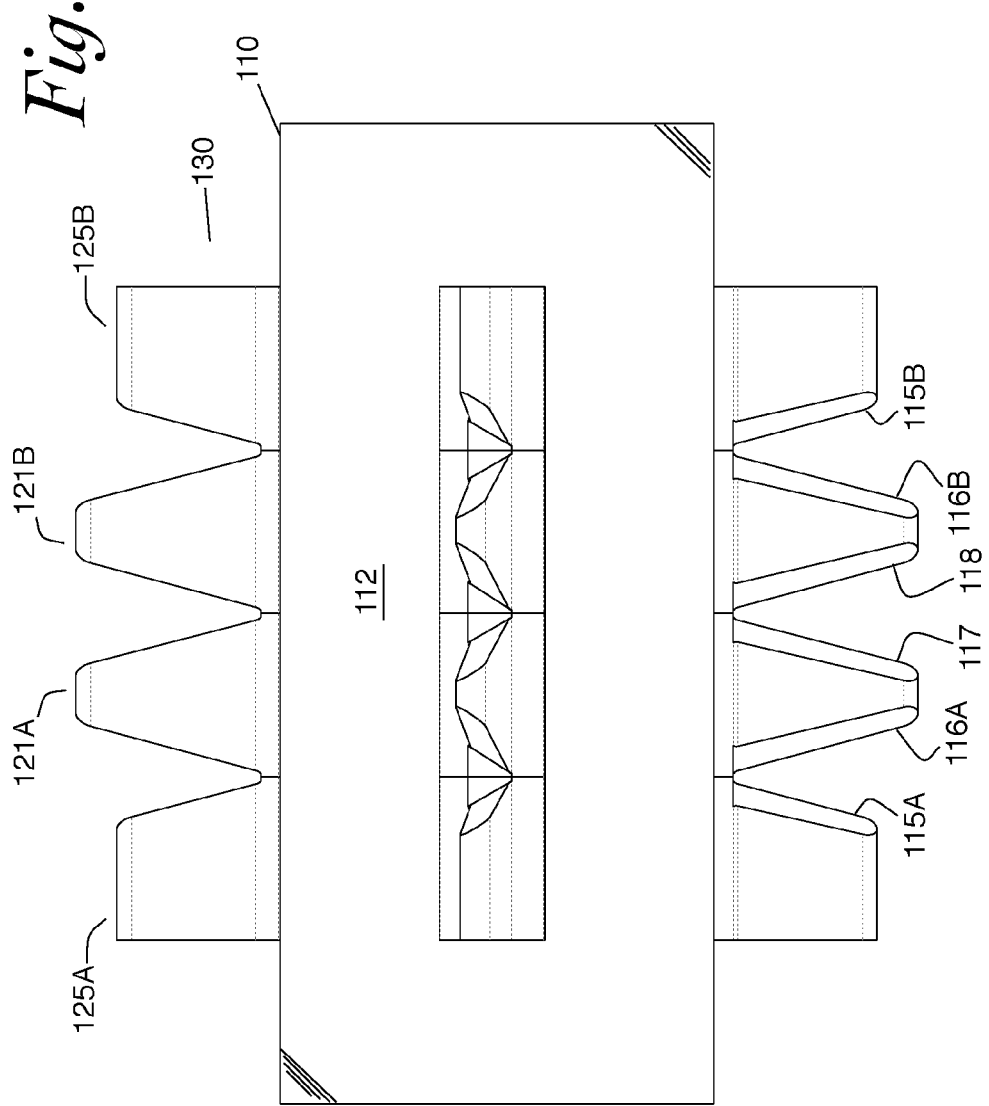
FIG. 8 is a front perspective view of an end of a cleated belt conveyor having taller central cleat members, the belt is shown as conformed about an end roller.

The cleat profile having the elevated central cleat members 121A, B is shown in FIG. 8 with three cleat rows 130 at various positions about an end roller. There is the cleat row 130 that is pointing downwardly, as the cleat row would return through the return pan 135. The front, grain facing cleat face is shown in this perspective. As illustrated, each of the sidewall is configured with a complementary surface with the adjacent cleat row sidewall. For example, the peripheral cleat internal edge 115A, B is beveled. Adjacent to the peripheral cleat internal edge 115A, B is the central cleat peripheral edge 116A, B. Both of these edges are beveled in a way that pushes the peripheral cleat member 125A, B forward, thereby forming a pocket for transporting granular material such as seed and grain. In a similar fashion, the first central cleat internal edge 117 and the second central cleat internal edge 118 are both beveled. Another cleat row 130 is shown in a top perspective, as the cleat row is coming around an end roller 245. A third cleat row 130 is shown from a rear perspective.

Figure 9:
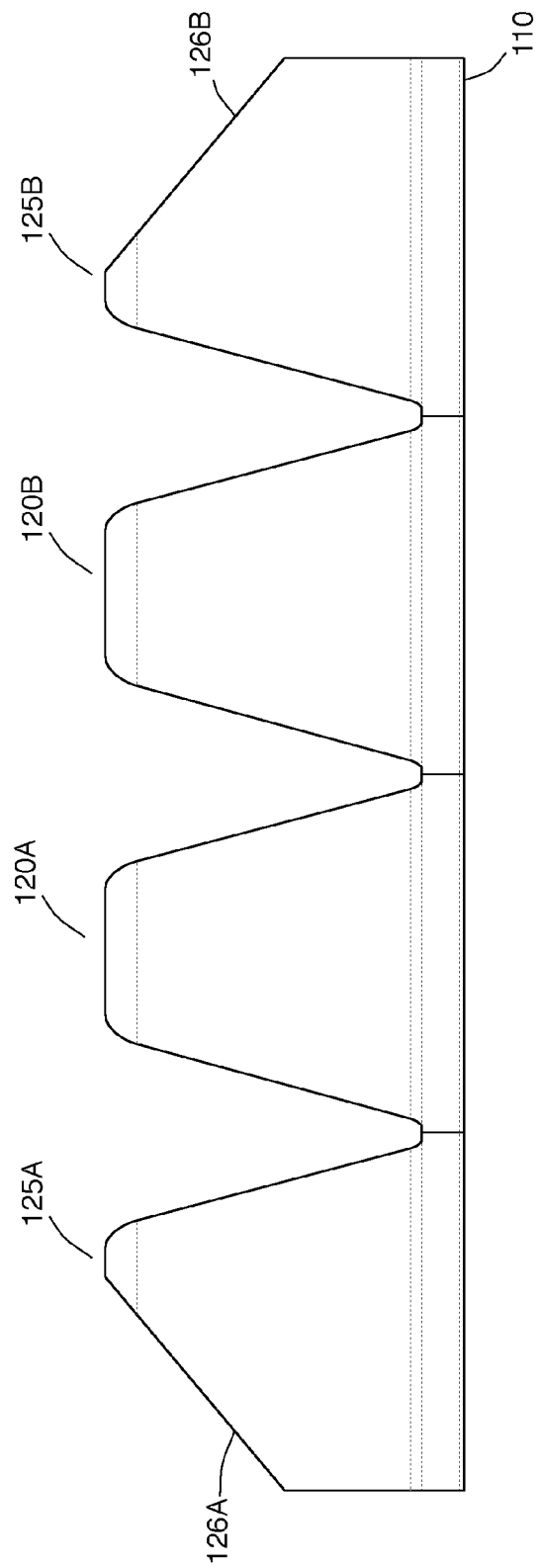
FIG. 9 is a front perspective view of a cleat row showing peripheral cleat member having a sloped edge portion in a flat configuration and not conformed within a curvilinear or tube structure.
Figure 10:
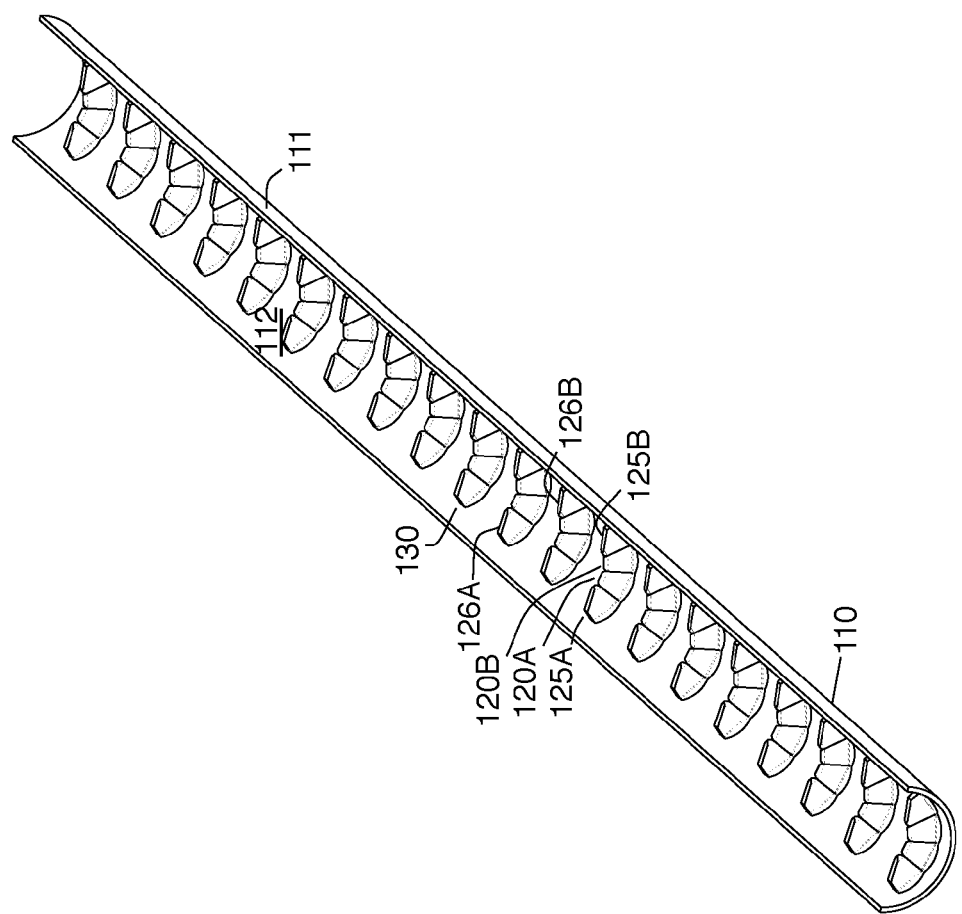
FIG. 10 is a top perspective view of the cleat row of FIG. 9 in configuration as conformed within a curvilinear structure, such as a tube.
Figure 11:
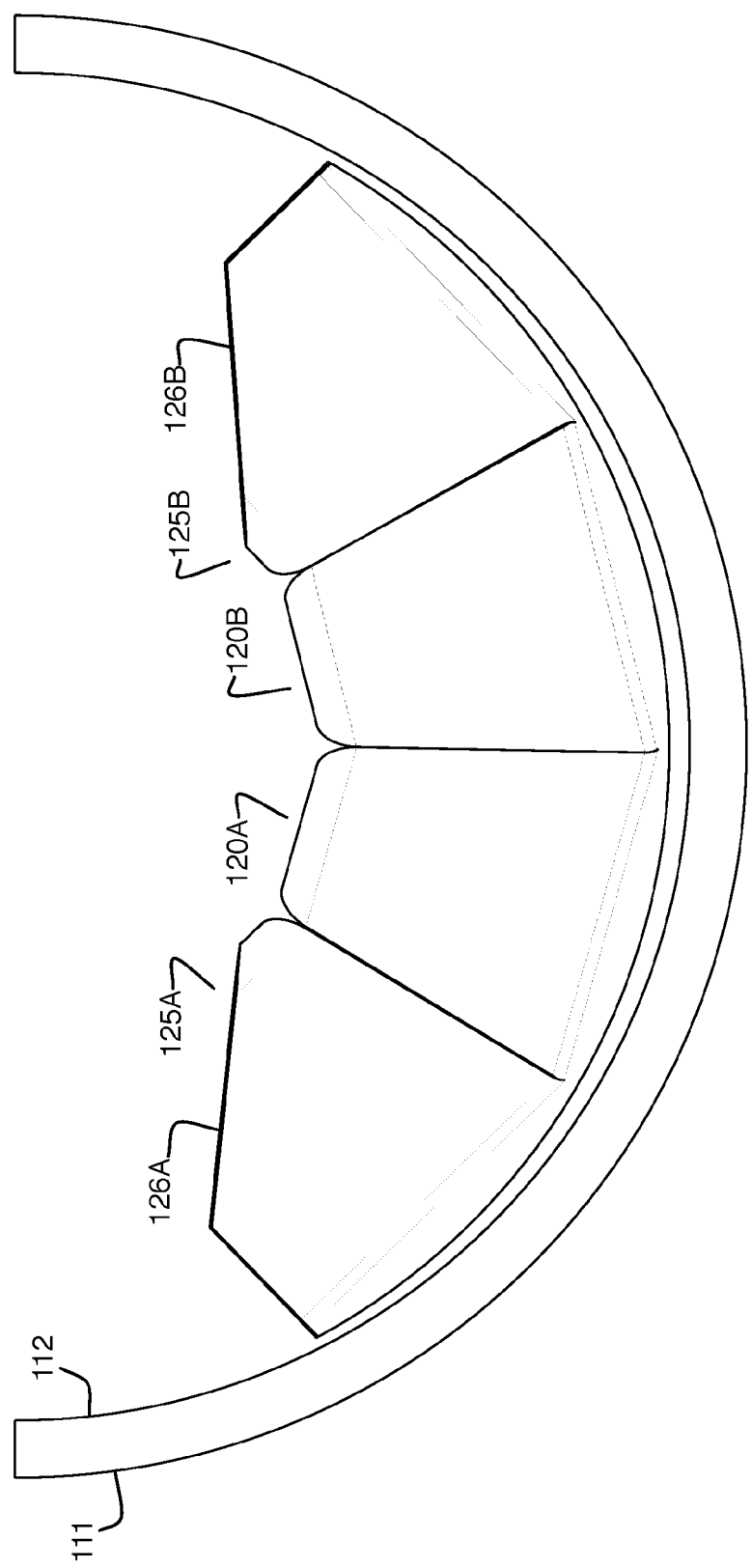
FIG. 11 is a front perspective view of a portion of a cleated belt having peripheral cleat member having a sloped edge portion as conformed within a curvilinear structure, such as a tube.
Figure 12:
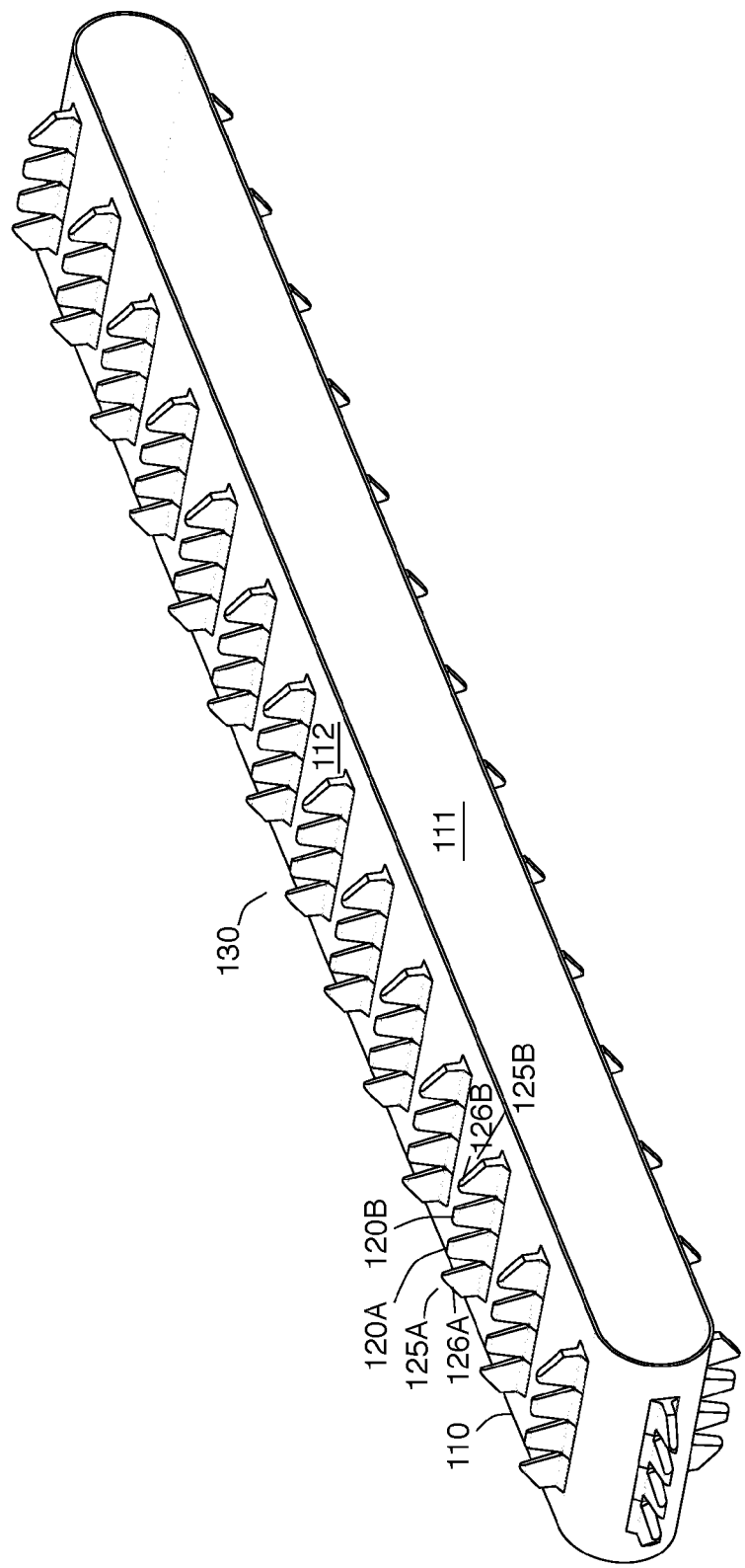
FIG. 12 is a top side perspective view of a cleated belt having a peripheral cleat member with a sloped edge portion, the belt shown in a flat configuration and not conformed within a curvilinear structure.
Figure 13:
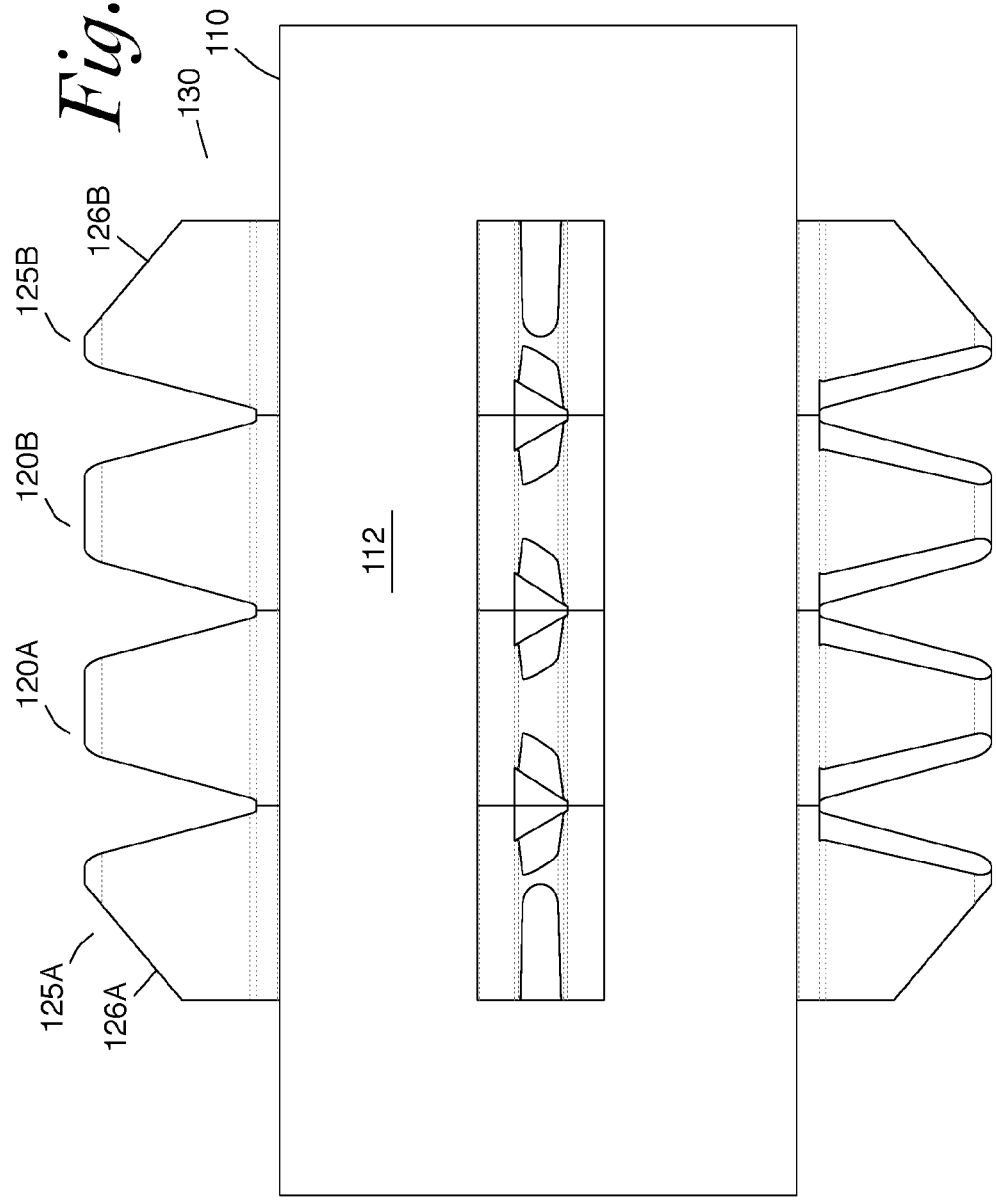
FIG. 13 is a front perspective view of an end of a cleated belt conveyor having a sloped edge portion, the belt is shown as conformed about an end roller.

An alternative cleat profile is shown in FIGS. 9-13. In this embodiment, each of the peripheral cleat members 125A, B have a clipped edge portion 126A, B such that the peripheral cleat members are slanted. The peripheral cleat members 126A, B can be formed with the clipped edge portion 126A, B or the edge portion can be remove post-formation. Each of these peripheral cleat members 125A, B with a slanted top portion have a taller central portion and a shorter peripheral portion. The flattened belt profile is shown in FIGS. 9, 12, and 13. The cleat wall formed by the cleat row 130 in the tube 105 is shown in FIGS. 10 and 11. In this embodiment, the taller central portion of each peripheral cleat member 125A, B cooperates with a respective central cleat member 120A, B. However, the shorter peripheral portion of the peripheral cleat member 125 prevents contact between the peripheral cleat member and the return pan or transition portions of the conveyor. FIG. 13 illustrates that similar beveled edges for each cleat member can encourage a similar curved pocket formation.

While not illustrated, it is contemplated that an alternative cleat row profile comprises a combination of one or more taller central cleat members 121A, B and one or more slanted or clipped peripheral cleat members 125A, B. The profile of an alternative cleat row 130 could show a stepped or gradual increase in cleat member height from the shortest one or more peripheral cleat members to a tallest one or more central cleat members.

Figure 20:
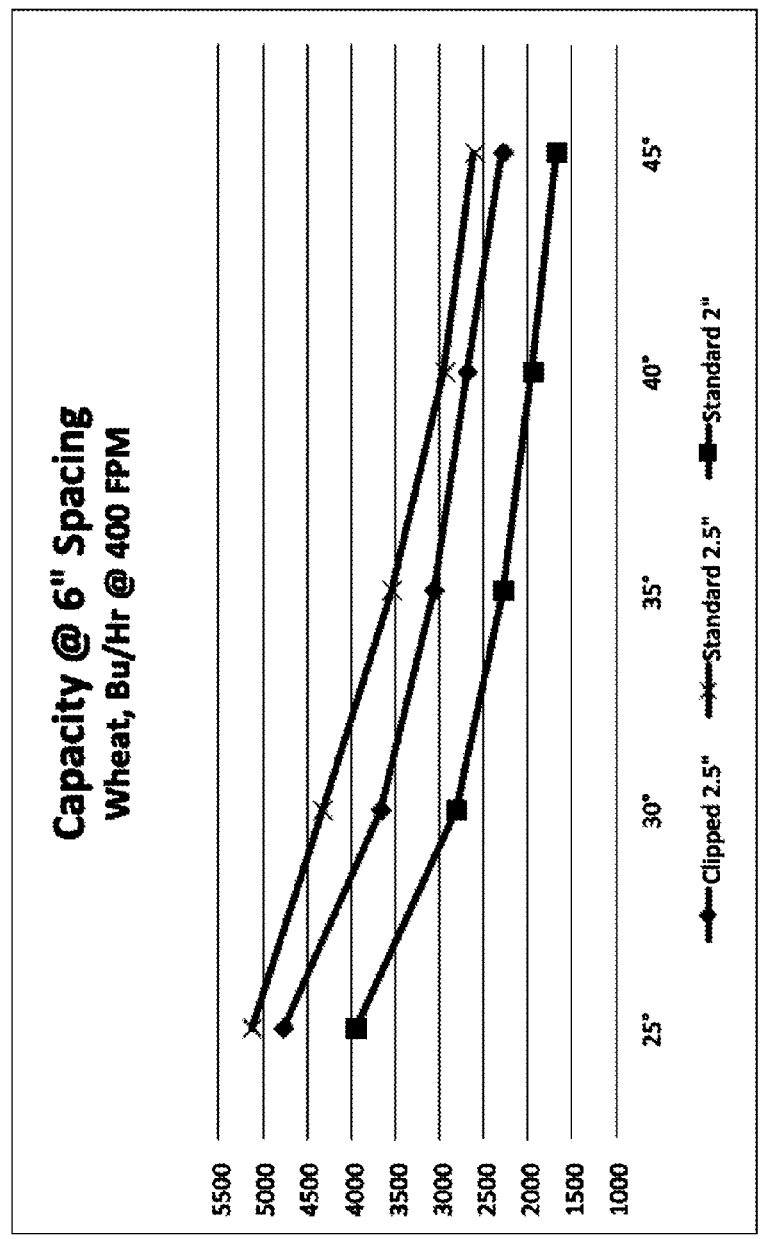
FIG. 20 shows a graph of the results of a test conducted to compare the transfer rate capacity of (1) Standard 2"—which is a cleated belt with uniform cleat member height of 2.0 inches; (2) Standard 2.5"—which is a cleated belt with the central cleat members increased to 2.5 inches and the peripheral cleat members with a height of 2.0 inches; and (3) Clipped 2.5"—which is a cleated belt with central cleat members increased to 2.5 inches and the clipped peripheral cleat members.

FIG. 20 shows the results of a test conducted to compare the transfer rate capacity of (1) Standard 2"—which is a cleated belt with uniform cleat member height of 2.0 inches; (2) Standard 2.5"—which is a cleated belt with the central cleat members increased to 2.5 inches and the peripheral cleat members with a height of 2.0 inches; and (3) Clipped 2.5"—which is a cleated belt with central cleat members increased to 2.5 inches and the clipped peripheral cleat members. The data show a substantial gain in transfer rate capacity of the cleated belt with the 2.5 inch central cleats over the standard 2.0 cleat. The data also show an improvement of belt with the clipped peripheral cleat members over the standard 2.0 inch cleat.

| Capacities of Different Cleat Heights at Given Spacing/Incline Angles Shown in bushels per hour at 400 feet per minute belt speed | | | | | | |
|---|---|---|---|---|---|---|
| | 25° | 30° | 35° | 40° | 45° | Average |
| Uniform 2.0 inch cleat members | 3,952 | 2,816 | 2,288 | 1,952 | 1,680 | 2,538 |
| 2.5 inch central member with clipped peripheral cleat members | 4,768 | 3,664 | 3,056 | 2,688 | 2,288 | 3,293 |
| 2.5 inch central member with 2.0 inch peripheral members | 5,120 | 4,320 | 3,536 | 2,944 | 2,608 | 3,706 |

As shown below, there is a significant gain in transfer capacity, which increases with the angle of operation of the conveyor. Conveyors operating at angles of 30 to 45 degrees show the greatest increase in capacity.

| Increase of Capacities over Standard 2.0 inch Cleat Members at Given Spacing/Incline Angles Shown in percentage increase in bushels per hour at 400 feet per minute belt speed relative to cleated belt with uniform 2.0 inch cleat members | | | | | |
|---|---|---|---|---|---|
| | 25° | 30° | 35° | 40° | 45° |
| 2.5 inch central member with clipped peripheral cleat members | 21% | 30% | 34% | 38% | 36% |
| 2.5 inch central member with 2.0 inch peripheral members | 30% | 53% | 55% | 51% | 55% |

The return pan 135 can be adjusted to accommodate the various cleat row profiles. The return is disposed adjacent to the curvilinear structure—such as the tube 105—and protects the conveyor during its return to the infeed portion. The return pan 135 has bottom portion that has a central portion and peripheral portions. The peripheral portions are disposed on the lateral sides of the central portion. In existing conveyors, the return pan 135 has a generally flat bottom surface. In one embodiment, the central portion of the bottom of the return pan is taller than the peripheral portion of the return pan. This configuration would accommodate taller central cleat members 121A, B, without risk of rubbing the cleat member against the return pan 135.

We also recognized that the transfer capacity of a cleated belt tube conveyor could be increased by increasing the height of a central cleat member of a cleat row relative to the peripheral cleat members. Generally, taller cleat members correspond with increased transfer capacity. However, after a certain threshold the cleat members begin to contact at least one of the transition elements and the return pan. This contact increases wear on the belt, leading to deterioration of the belt material. By increasing the height of one or more of the central cleat members relative to the height of the peripheral cleat members, we can increase the transfer capacity of the cleated belt tube conveyor without increasing the deterioration of the belt material.

Figure 14:
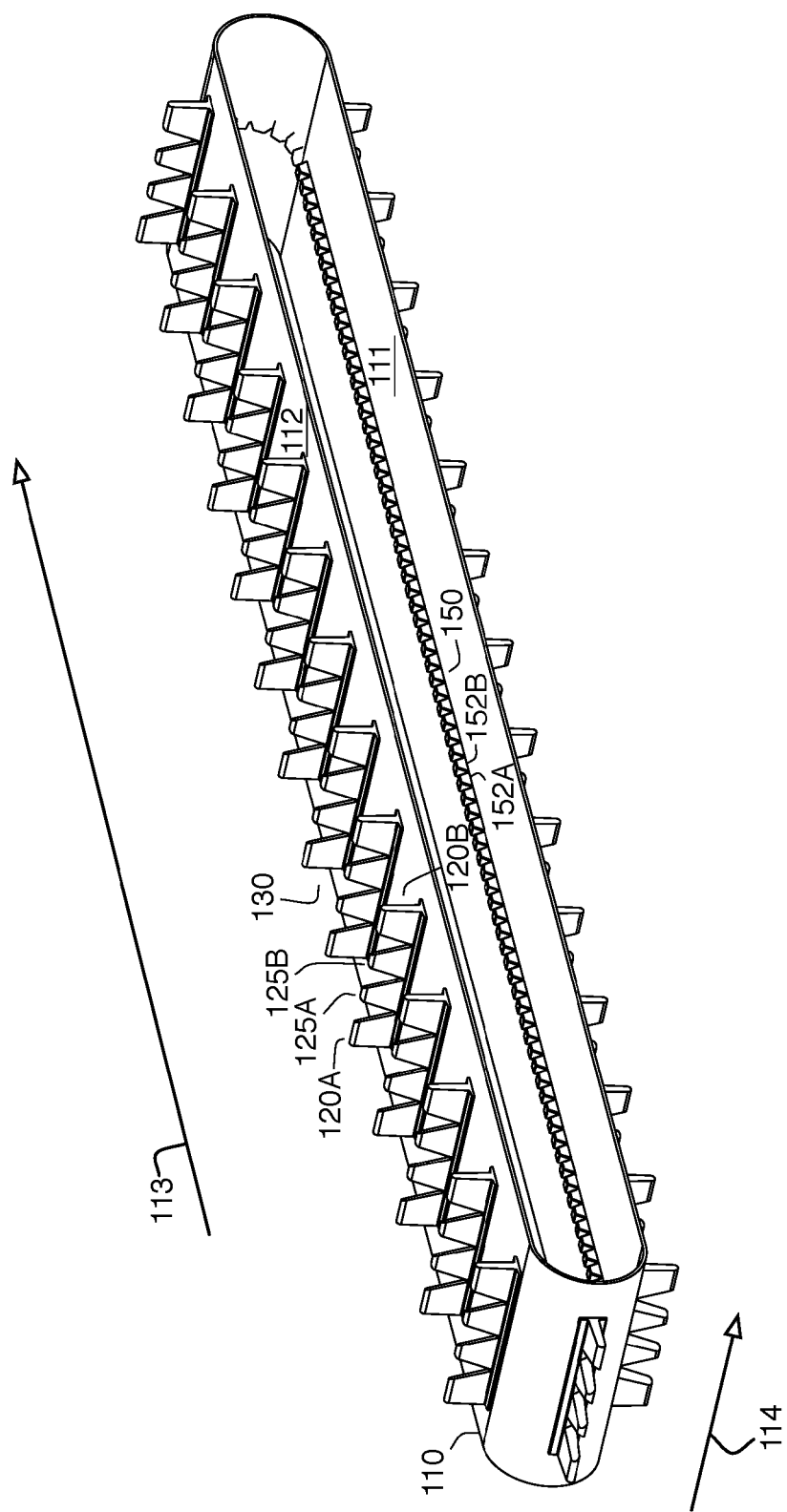
FIG. 14 is a side perspective view of a cleated belt conveyor having a lower guide element in a flat configuration and not conformed within a curvilinear structure.
Figure 15:
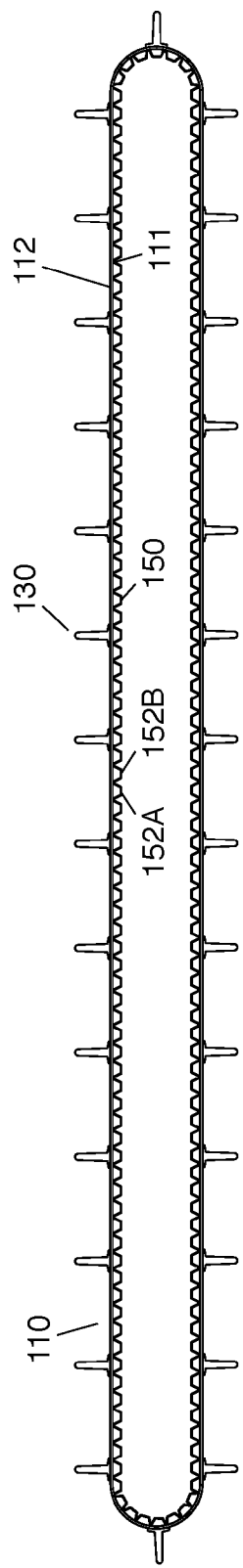
FIG. 15 is a side perspective view of the conveyor of FIG. 14.
Figure 16:
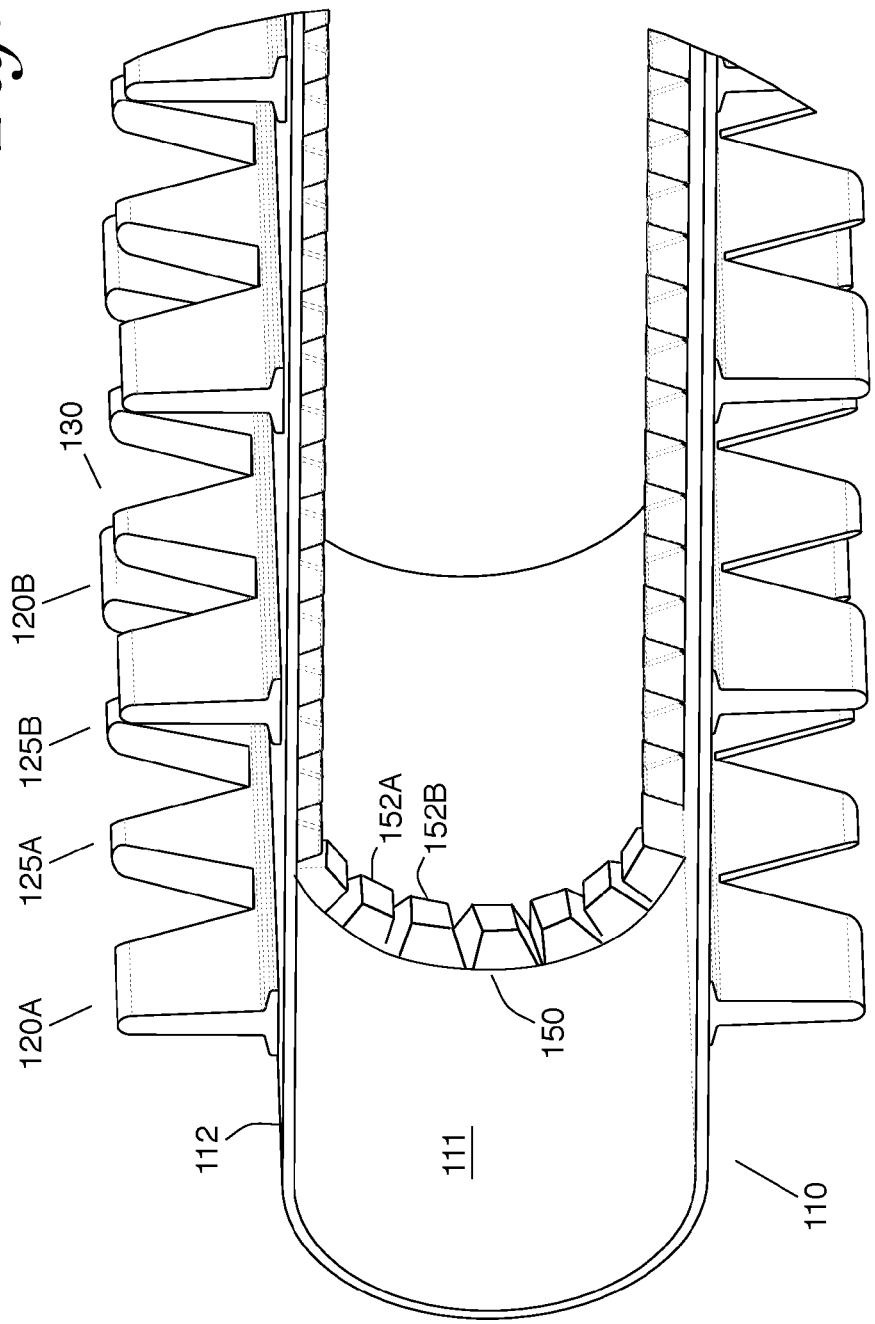
FIG. 16 is an enlarged side perspective of an end section of the cleated belt conveyor of FIG. 4.

The lower surface 145 of the belt 110 can comprise a lower guide element 150 as shown in FIGS. 14-16. The lower guide element 150 extends from the lower surface of the conveyor belt 110. The lower guide element 150 assists with tracking the conveyor belt 110. In the embodiment as illustrated in FIG. 14-16, the lower guide element is segmented into a plurality of laterally aligned, longitudinally spaced-apart lugs 152A, B. The segmented lower guide element 150 is divided into a plurality of separate, longitudinally spaced-apart lugs 152A, B that extend from a lower surface of the cleated conveyor belt. In one embodiment, the plurality of laterally aligned, longitudinally spaced-apart lugs are bonded to the non-carrying, bottom surface of the conveyor belt. In one embodiment, the lower guide element 150 can comprise portions of a standard V-belt, such as a ⅝" wide B-section V belt. Alternatively, the lower guide element 150 can comprise a cogged belt that is bonded to a laterally aligned portion of the lower belt surface 111, such as the central lateral portion of the belt. It is preferred that the lower guide element extend about the entire lower surface of the endless belt.

Figure 17:
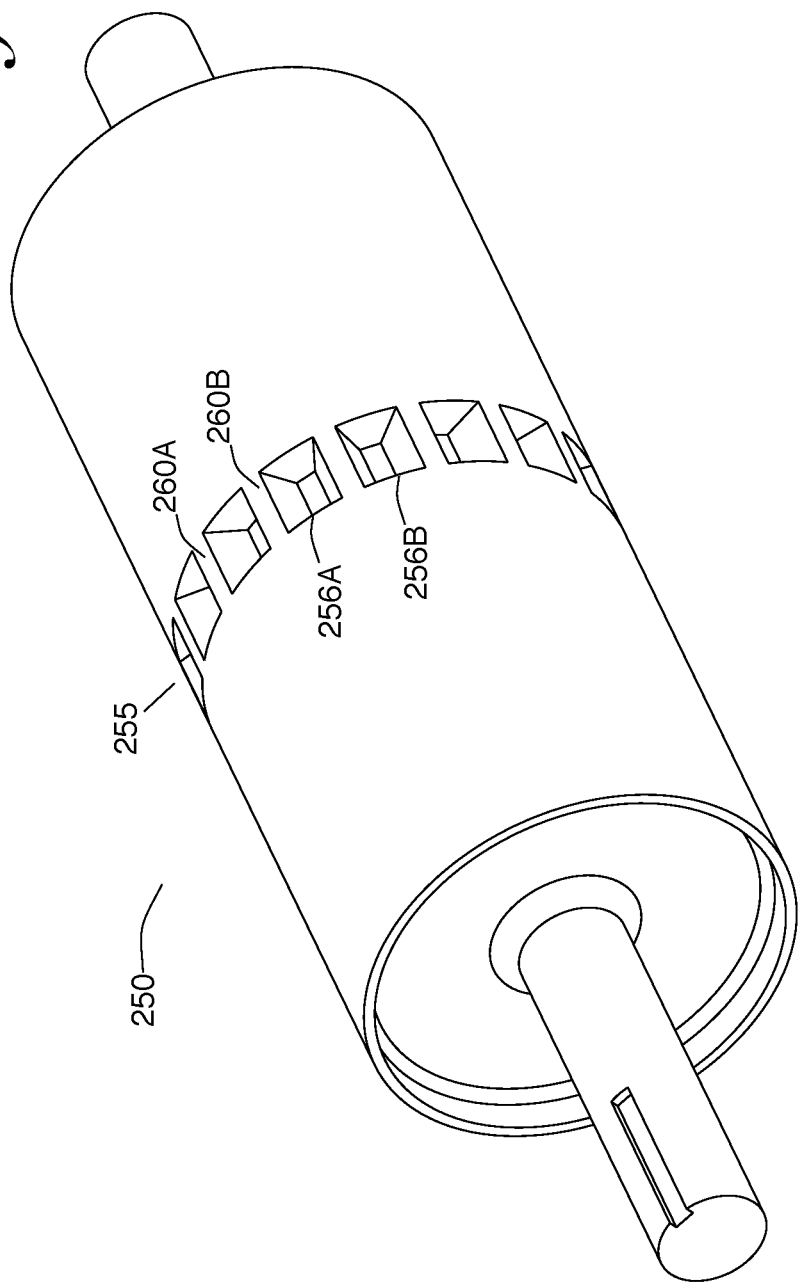
FIG. 17 shows a side perspective view of a cogged roller having a channel and drive bars complementary to the lower guide element of the cleated belt conveyor of FIG. 4.
Figure 18:
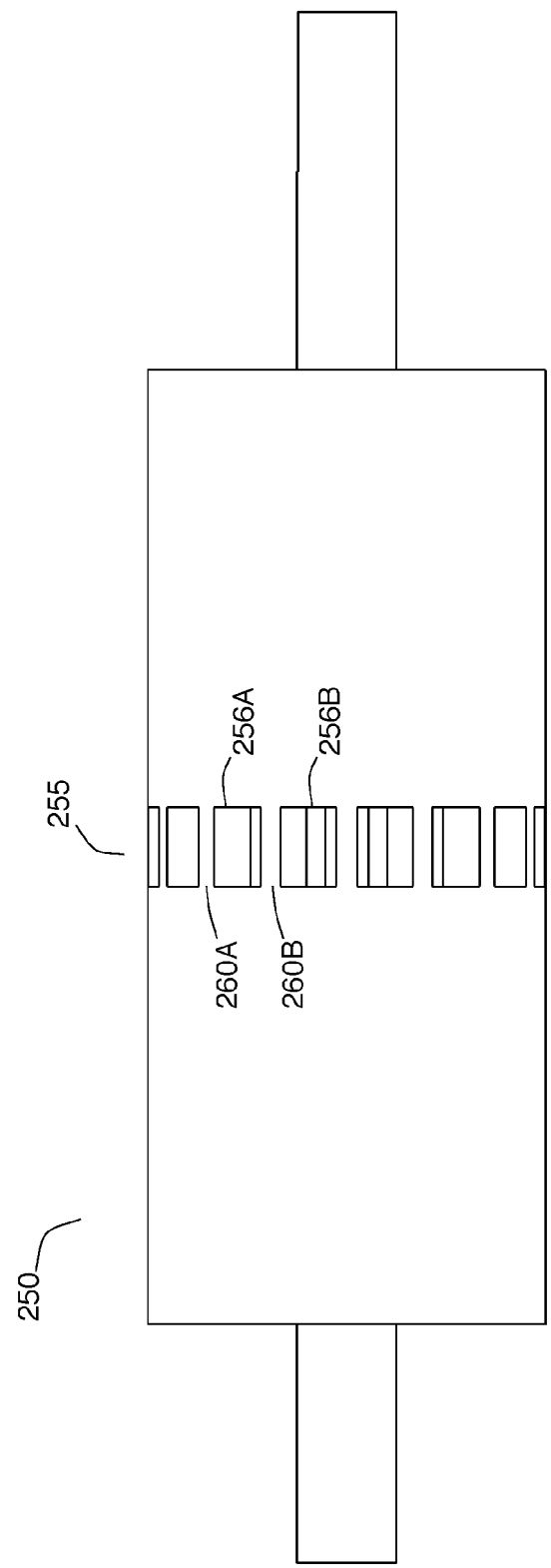
FIG. 18 shows a front perspective view of the cogged roller of FIG. 17.
Figure 19:
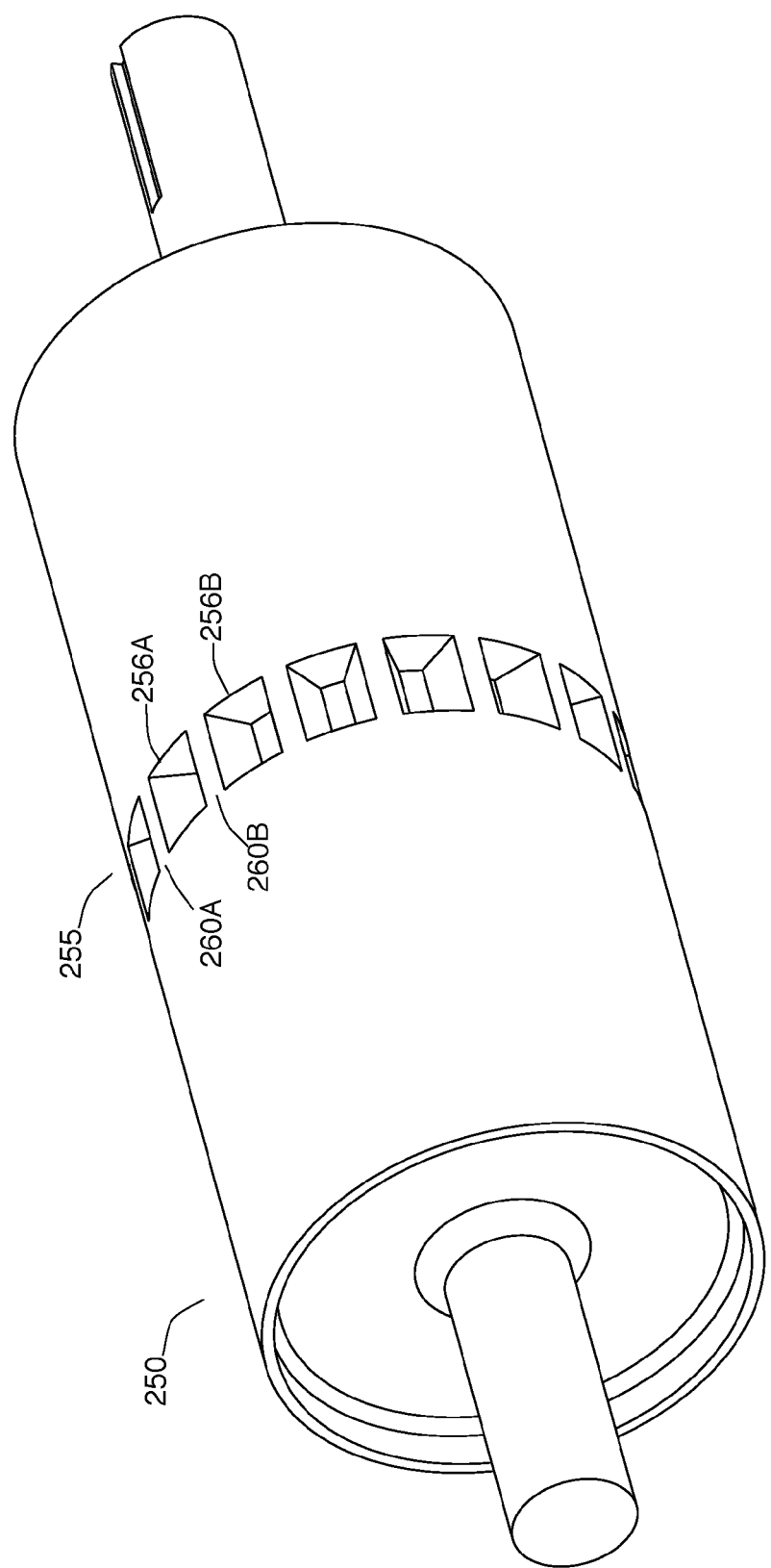
FIG. 19 shows a side perspective view of the cogged roller of FIG. 17.

A complementary keyed roller 250 can cooperate with the lower guide element to maintain belt tracking, as shown in FIGS. 17-19. The complementary keyed roller 250 has a circumferential channel 255 corresponding to the lateral position of the lower guide element. The circumferential channel 255 is sufficiently deep enough to receive the height of the lower guide element 150. In this way, the channel 250 continually receives the lower guide element 150 as the belt is driven about the roller.

The keyed roller can also comprise a plurality of circumferentially spaced apart drive bars 260A, B that engage the lugs 152A, B of the segmented lower guide element 150, as shown in FIGS. 17-19. Each respective drive bar 260A, B engages a respective spaced-apart lug 152A, B as the belt is driven about the keyed roller 250. The circumferentially spaced-apart drive bars 260A, B can be disposed about the channel 250, as shown in FIGS. 17-19, to engage the individual lugs of the segmented lower guide element to increase power transfer from the driven roller to the belt. The spacing of the drive bars corresponds with the longitudinal length of the segments or lugs 152A, B of the segmented lower guide element 150. In the embodiment shown in FIGS. 17-19, the drive bars 260A, B are integrally formed with the keyed roller. In this way, the drive bars 260A, B divide the channel 255 into a plurality of channel segments 256A, B. Each channel segment 256A, B corresponds to the size and shape of the lugs 152A, B. In another embodiment, the drive bars 260 are mounted within the channel 255 of the keyed roller 250.

Several alternate embodiments of the baffle assembly 165 will now be presented. In one embodiment, the baffle assembly 165 is comprised of a tube with a diameter smaller than the main conveyor tube 105. The smaller tube is inserted into the conveyor tube 105. In another embodiment, a single baffle assembly 165 is mounted within the tube 105 near the discharge end of the conveyor, where the belt exits the tube. As the cleat row 130 unfolds in the transition portion, the particulate matter starts to back flow through the separating cleat. This back flow causes the particulate to slide backwards, disturbing subsequent pockets of particulate matter. When the backflowing material encounters the baffle assembly, the material is preventing from sliding further back the conveyor. In this way, the baffle assembly prevents material back flow between cleat row segments.

In another embodiment, the baffle assembly 165 comprises a flat plate, with a profile cut to fit the top of the cleat row profile in the tube. The baffle assembly 165 can be statically mounted within the tube 105 or to the conveyor frame 101. Alternatively, the baffle assembly 165 adjustably mounted within the tube 105, such that the baffle can be lowered or raised. The statically mounted tube can be bolted or welded within the tube, or otherwise securely mounted within the tube. A baffle assembly 165 that is adjustably mounted within the tube, can incorporate an access aperture (not shown) in the top of the tube. A mounting flange (not shown) can be mounted to the top of the tube 105. An adjustment bolt is provided that is received by the mounting flange through a securing nut and is securely mounted to the baffle assembly 160 at one end. In this way, the baffle assembly 165 can be adjusted. For example, the baffle assembly 165 can be lowered—to engage the baffle—when the conveyor 100 is operating at operating angles that exceed 30, 35, 40, or 45 degrees. The baffle assembly 165 can be raised—to disengage the baffle—when the conveyor 100 is operating at operating angles that are less than 30, 35, or 40 degrees. An advantage to the adjustable baffle assembly mount is that it allows the baffle to be raised to make installation of a belt through the primary tube easier.

Figure 21:
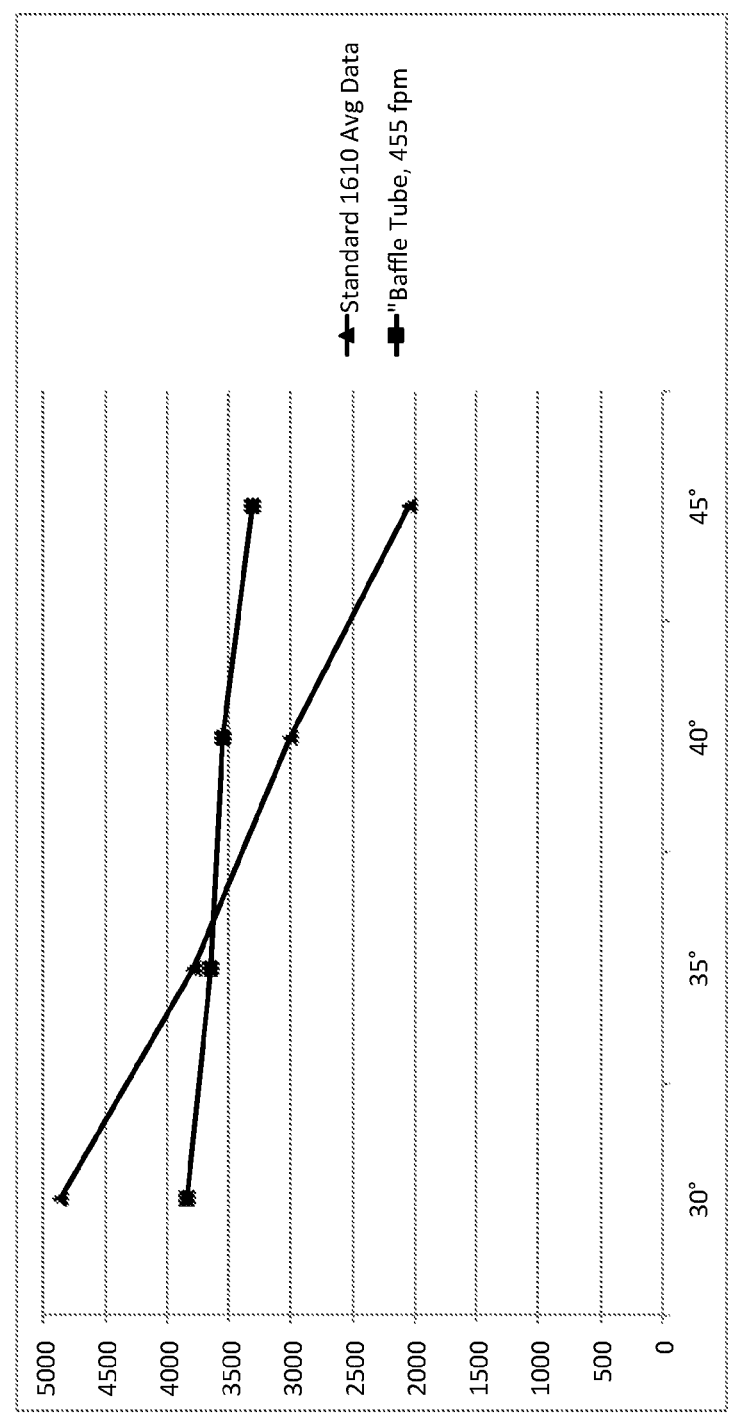
FIG. 21 shows a graph of the results of a test conducted to compare the transfer rate capacity of a cleated belt tube conveyor incorporating a baffle assembly with a standard cleated belt tube conveyor.

Test results for a conveyor incorporating a baffle assembly 165 are shown in FIG. 21. The transfer rate was measures in bushels per hour at various operating angles between 30-45 degrees. At an operating angle of 30 degrees, the baffle assembly 165 decreased the transfer capacity of the conveyor. However, at an operating angle of 35 degrees, the baffle assembly had an approximately equal transfer rate. At angles of operation of 40 and 45 degree, the baffle tube—the conveyor tube having a baffle assembly 165—exceeding the transfer rate of a standard tube conveyor.

In one embodiment, the baffle plate is hingedly mounted to the top of the tube. In this way, the baffle acts as a one-way valve, so grain piled higher than the cleat can push the baffle forward. However, the hinge is limited at an angle less than or equal to 90 degrees from the longitudinal axis of the tube conveyor. In this way, the hinged baffle prevents grain from flowing backwards without disturbing grain pockets.

In one embodiment, the baffle assembly comprises a tube within a tube. In one embodiment, a 6" tube—or a portion thereof—is inserted in a 10" tube to fill space between the cleat and the exterior tube. In one embodiment, a one-half longitudinal portion of the smaller tube is adjustably mounted within the main conveyor tube. In one embodiment, the baffle assembly 165 extends through the entire length of the conveyor 100. The baffle assembly 165 is mounted to the interior surface of a top portion of the exterior tube. In another embodiment, the baffle assembly can have a tapered end, to gently guide the grain into the cleated belt pocket.

It is understood that the invention is not confined to the particular construction and arrangement of parts herein described. That although the drawings and specification set forth a preferred embodiment, and although specific terms are employed, they are used in a description sense only and embody all such forms as come within the scope of the following claims.

In the Summary above, the Detailed Description, and in the accompanying drawings, reference is made to particular features including method steps of the invention. The reader should understand that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally. It is understood that the invention is not confined to the particular construction and arrangement of parts herein described. That although the drawings and specification set forth a preferred embodiment, and although specific terms are employed, they are used in a description sense only and embody all such forms as come within the scope of the following claims.

The term "comprises" and its grammatical equivalents are used in this document to mean that other components, steps, etc. are optionally present. For example, an article "comprising" or "which comprises" components A, B, and C can consist of components A, B, and C, or can contain not only components A, B, and C but also one or more other components.

We claim:

1. A conveyor having a curvilinear structure for conveying granular material, the conveyor comprising:
   a. A belt having a first belt surface;
   b. A plurality of cleat members extending from the first belt surface, the cleat members having a flat configuration and a conformed configuration wherein the belt conforms to the curvilinear structure and the cleat members cooperatively form a cleat wall during movement of the belt through the curvilinear structure, the plurality of cleat members comprising:
      i. A first peripheral cleat member;
      ii. A second peripheral cleat member;
      iii. A first central cleat member;
      iv. a second central cleat member;
   c. Wherein the first central cleat member is taller than the first peripheral cleat member in the flat configuration and the second central cleat member is taller than the second peripheral cleat member in the flat configuration; and
   d. The cleat wall comprising:
      i. a raised central portion formed by cooperation of the first central cleat member and the second central cleat member.

2. The conveyor of claim 1, wherein each of the plurality of cleat members extend at an angle generally perpendicular to the first belt surface.

3. The conveyor of claim 1, wherein the cleat wall is oriented along a transverse axis of the belt.

4. The conveyor of claim 1, wherein each of the first peripheral cleat member and the second peripheral cleat member comprise:
   a. a taller central portion having a top edge parallel with the belt in the flat configuration;
   b. a shorter peripheral portion; and
   c. a clipped edge portion extending between the taller central portion and the shorter peripheral portion, the clipped edge portion extending perpendicular to a vertical axis of the curvilinear structure in the conformed configuration.

5. The conveyor of claim 1, further comprising:
   a. A guide element mounted to an inner belt surface, the guide element comprising:
      i. A plurality of longitudinally spaced-apart lugs that extend from an inner surface of the belt.

6. The conveyor of claim 1, further comprising:
   a. A first tube portion having a first flange;
   b. A second tube portion having a second flange; and
   c. A baffle assembly disposed within the [[tube]] curvilinear structure between the first tube portion and the second tube portion, the baffle assembly comprising:
      i. a U-shaped aperture configured to receive the belt therethrough; and
      ii. a solid portion comprising an annular ring extending above and below the U-shaped aperture;
      iii. a plurality of mounting apertures circumferentially disposed about the solid portion, the plurality of mounting apertures being disposed above and below the U-shaped aperture;
   d. wherein the solid portion is configured to at least partially fill the space between the cleat wall and an inner surface of the curvilinear structure.

7. The conveyor of claim 6, wherein the baffle assembly is vertically adjustably mounted within the curvilinear structure to lower or raise the U-shaped aperture relative to the curvilinear structure.

8. The conveyor of claim 6, wherein the U shaped aperture has a height that corresponds to the height of the cleat wall.

9. The conveyor of claim 1, the cleat wall further comprising:
   a. a first peripheral portion extending above the first central cleat member in the conformed configuration, the first peripheral portion formed by a first peripheral edge of the first peripheral cleat member; and
   b. a second peripheral portion extending above the second central cleat member in the conformed configuration, the second peripheral portion formed by a second peripheral edge of the second peripheral cleat member.

10. The conveyor of claim 9, wherein:
   a. Each of the first peripheral cleat member, the second peripheral cleat member, the first central cleat member, and the second central cleat member has a respective top portion that is parallel with the belt in the flat configuration.

11. The conveyor of claim 1, further comprising:
   a. A peripheral edge of each of the first peripheral cleat member and the second peripheral cleat member extending above the raised central portion in the conformed configuration; and
   b. A central edge of each of the first peripheral cleat member and the second peripheral cleat member extending to a point below a top edge of the raised central portion in the conformed configuration.

12. A tube conveyor system for conveying grains and other particulate materials, the tube conveyor system comprising:
   a. an endless belt having an outer surface, a longitudinal axis, a transverse axis, a flat configuration, and a conformed configuration;
   b. a plurality of longitudinally spaced-apart cleat rows extending from the outer surface of the endless belt and along a transverse axis of the endless belt, each of the longitudinally spaced-apart cleat rows comprising:
      i. a central cleat member having a top portion;
      ii. a peripheral cleat member having:
         1. a central portion,
         2. a peripheral portion, and
         3. a slanted top portion between the central portion and the peripheral portion;
   c. in the flat configuration, the central portion of the peripheral cleat member is taller than the peripheral portion of the peripheral cleat member; and
   d. in the conformed configuration, the endless belt conforms to a curvilinear cross section of the tube conveyor system thereby conforming a cleat row to a non-overlapping cleat wall wherein the slanted top portion is perpendicular to a vertical axis of the tube conveyor system.

13. The tube conveyor system of claim 12, wherein each of the longitudinally spaced-apart cleat rows further comprises:
   a. The central cleat member is taller than the central portion of the peripheral cleat member.

14. The tube conveyor system of claim 12, wherein the central cleat member has a trapezoidal shape.

15. The tube conveyor system of claim 12, wherein the peripheral portion of the peripheral cleat member is higher than the top portion of the central cleat member in the conformed configuration.

* * * * *